(12) United States Patent
Lapert

(10) Patent No.: US 7,694,802 B2
(45) Date of Patent: Apr. 13, 2010

(54) INDIVIDUAL SUPPORT DEVICE FOR A CONTAINER PROVIDED WITH A NECK AND INSTALLATION PROVIDED WITH TRANSPORT DEVICES WITH SUCH A SUPPORT DEVICE

(75) Inventor: Christophe Lapert, Octeville sur Mer (FR)

(73) Assignee: Sidel Participations, Octeville sur Mer (FR)

(*) Notice: Subject to any disclaimer, the term of this patent is extended or adjusted under 35 U.S.C. 154(b) by 362 days.

(21) Appl. No.: 11/826,584

(22) Filed: Jul. 17, 2007

(65) Prior Publication Data

US 2008/0017779 A1    Jan. 24, 2008

(30) Foreign Application Priority Data

Jul. 20, 2006   (FR) .................................. 06 06622

(51) Int. Cl.
*B29C 31/08* (2006.01)
*B65G 47/90* (2006.01)

(52) U.S. Cl. ............ 198/470.1; 198/803.7; 198/803.12; 279/2.23; 425/534

(58) Field of Classification Search ................. 425/534; 198/803.7, 803.12, 470.1; 294/82.28, 93; 279/2.23

See application file for complete search history.

(56) References Cited

U.S. PATENT DOCUMENTS

| | | | |
|---|---|---|---|
| 3,118,683 A | * | 1/1964 | Akira .......................... 279/2.23 |
| 3,958,685 A | * | 5/1976 | McDonald et al. ........ 294/82.28 |
| 4,483,436 A | * | 11/1984 | Krishnakumar et al. ..... 425/534 |
| 5,419,427 A | | 5/1995 | Wurgler |
| 5,947,484 A | * | 9/1999 | Huggins et al. ............. 279/43.4 |
| 6,106,273 A | | 8/2000 | O'Dell |
| 6,612,095 B2 | * | 9/2003 | Hartness ................... 198/803.7 |
| 2004/0121038 A1 | * | 6/2004 | Seki et al. .................... 425/534 |
| 2005/0092892 A1 | | 5/2005 | Goss |

FOREIGN PATENT DOCUMENTS

WO    02/38353 A2    5/2002

\* cited by examiner

*Primary Examiner*—Robert B Davis
(74) *Attorney, Agent, or Firm*—Sughrue Mion, PLLC

(57) ABSTRACT

An individual support device (5) for a container provided with a neck (6), including a support member (4) that engages inside the neck (6) and support elements (7) which are elastically retractable in the radial direction and bear with friction against the internal wall of the neck (6). The support member includes a substantially axisymmetric cylindrical base (8) having a peripheral channel (9) defined between a core (10) and an external wall (11) perforated by at least one row of apertures (12) of circular contour, balls (13) forming the support elements (7), arranged in at least one row in the channel (9) opposite respective apertures (12), the balls (13) having a diameter greater than the diameter of the apertures (12), and elastic return mechanism (14) between the core (10) and the balls (13) such that the balls are pushed back into the respective apertures (12) and project outside thereof.

9 Claims, 1 Drawing Sheet

INDIVIDUAL SUPPORT DEVICE FOR A CONTAINER PROVIDED WITH A NECK AND INSTALLATION PROVIDED WITH TRANSPORT DEVICES WITH SUCH A SUPPORT DEVICE

TECHNICAL FIELD

The present invention relates to an individual support device for a container provided with a neck, capable of supporting said container by its neck, said device comprising a support member which is capable of being engaged inside the neck of the container and which comprises support elements which are elastically retractable in the radial direction and capable of bearing with friction against the internal wall of said neck.

The invention applies more particularly to in-line processing installations for the manufacture or the processing of containers made of thermoplastic material, such as PET, in which the containers are displaced individually one after the other using transport devices capable of holding the containers by their neck, so as to leave their bodies free. Nevertheless, the invention may also be applied in any installation where it is necessary to displace a container from one point to another.

BACKGROUND OF THE INVENTION

In the remainder of the description, "container provided with a neck" is understood to be any hollow body having a neck, such as preforms, from which containers are manufactured by blow moulding or stretch blow moulding, intermediate containers in multiple blow moulding or stretch blow moulding processes, containers formed into their definitive shape and having to undergo an additional process and finished containers.

In the particular case of transporting preforms in order to heat said preforms prior to the blow moulding step, it is necessary to provide a transfer device allowing a preform to be picked up by its neck ("donning") and to be displaced into a heating zone, generally into a tunnel oven, in which its body has to be heated to the glass transition temperature of the thermoplastic material, whilst remaining at a temperature lower than the crystallization temperature.

To carry out this transfer, transport elements are provided equipped with gripping devices formed by a mandrel which is capable of being engaged inside the neck of the preform (internal donning) and which holds said neck of the preform by pressing against the internal face of the neck.

A device for the internal donning of preforms is presented in the document FR 2 706 876 in the name of the applicant, using a gripping head having one end with a split ring. More specifically, a mandrel is provided which comprises a mandrel body with an annular groove inside of which an elastically deformable split ring is accommodated, freely rotating in the radial direction. The mandrel is introduced inside the neck of the preform until the edge of the orifice of the neck abuts against an annular shoulder of the body of the mandrel. According to this embodiment, the external diameter of the undeformed ring is substantially greater than the external diameter of the body of the mandrel and the internal diameter of the neck.

According to the same principle of internal donning, it is known according to the document FR 2 794 109 in the name of the applicant, to implement a system for conveying preforms formed by a set of transport elements each comprising a gripping device provided at its free end with a split annular ring formed by a plurality of sections; when the ring is engaged internally in the neck of a preform, the sections urged radially towards the outside by the elastic means are capable of bearing against the internal cylindrical surface of the neck.

By overdimensioning the external diameter of the split ring in the free state relative to the internal diameter of the neck of the preform which is slightly less than said external diameter of the split ring, the elastic split ring or section ring is capable of being radially deformed towards the inside during the insertion of the gripping head in the neck, whilst permitting the creation of frictional forces between the internal wall of the neck and the external periphery of the split ring or section ring, thus causing the attachment and holding of the preform on the gripping device.

The drawback of the gripping devices according to the prior art lies in the fact that they have a relatively reduced tolerance with regard to variations in the internal diameter of the necks, for example due to different ways of manufacturing preforms (different manufacturers, different manufacturing periods, etc.). Thus it is necessary to replace said gripping devices if it is desired to transport containers with very slightly different internal diameters. Due to the considerable number of gripping devices (several hundred) being able to equip a transport installation, this results in the installations in which said gripping devices are used being immobile for long periods and a considerable cost of materials kept in reserve.

In practice there is, therefore, a constant demand for a gripping device by internal donning of the container having a greater tolerance to variations in the internal diameters of the necks of the containers.

Moreover, the gripping devices by internal donning according to the prior art do not have sufficient surface contact, resulting in a risk that the container is gripped in the inclined position, and even a risk of the container being detached during the transportation thereof.

Finally, the ring sections do not have a planar external surface but a channel defining two annular projections axially separated from one another (the straight section of the sections has a very open V shape) by means of which contact with the smooth internal face of the necks is made. These ring sections formed in this manner have to be machined with a very high degree of precision in order to ensure that the two annular projections bear effectively against the neck over their entire periphery, which guarantees correct axial positioning of the container. As a result, the ring sections formed in this manner are costly.

A device for gripping the container which makes it possible to guarantee more accurately the axial alignment of the container during its transport is, therefore, repeatedly required in practice, and by having recourse to means which are less costly than those currently used.

SUMMARY OF THE INVENTION

The present invention proposes to resolve, at least partially, the problems associated with the prior art by proposing an individual support device for a container provided with a neck, capable of supporting said container by its neck, comprising a support member which is capable of being engaged inside the neck of the container and which comprises support elements which are elastically retractable in the radial direction and capable of bearing with friction against the internal wall of said neck, characterized in that the support member comprises:

a substantially axisymmetric cylindrical base comprising a peripheral channel defined between a central core and an external wall forming a skirt surrounding said core at a radial distance and perforated by at least one row of apertures of circular contour, a plurality of balls forming the aforementioned support elements, of equal number to that of the apertures and arranged in at least one row in said channel, being located opposite the respective apertures, the balls having a diameter substantially greater than the diameter of the apertures, and elastic return means interposed between said core and the balls such that said balls are pushed back elastically into the respective apertures and project partially outside thereof.

An internal donning device arranged with retractable balls according to the invention is able to cooperate with necks of containers of which the diameters vary in a much wider range than the tolerance range accepted by the gripping devices with section rings of the prior art. Typically, the device with retractable balls according to the invention accepts variations of more or less 0.5 mm to the internal diameter of the necks, whilst the devices with section rings only accept a tolerance of more or less 0.12 mm.

Furthermore, the manufacture of a gripping head designed according to the invention does not require machining as precise as that required for the gripping heads with section rings and it thus proves to be less expensive.

Naturally, gripping devices with retractable balls are already known. However, they are gripping devices which are capable of overlapping the necks of the containers and which are arranged to grip the necks by the external face thereof (external donning). The applicant has made use of such gripping devices by external donning with retractable balls for many years. Nevertheless, in said external donning devices the problem is posed of mechanically fixing the gripping head equipped with retractable balls to the neck of the containers, or put more simply, due to the fact that during the donning process the balls bear under projecting raised portions of the external face of the neck (annular groove provided for the antitamper ring of the closure cap of the container, screw threads of the cap when the cap is screwable).

In contrast, the internal face of the neck of the containers is generally smooth and offers no support for the balls: the mechanical connection of the gripping head according to the invention to the neck of the containers rests solely on the tangential friction between the surfaces in contact.

In order to ensure more efficiently the support of the container in a substantially coaxial manner to the axis of the support device and to increase the frictional forces between the balls and the internal wall of the neck, it is preferable that the apertures of the external wall are distributed in a plurality of parallel rows and in that the balls are arranged in a plurality of respective rows. In practice, it may suffice that the apertures of the external wall are distributed in two parallel rows and that the balls are arranged in two respective rows; but a greater number of rows of apertures and balls (for example three) may be adopted if this proves necessary for obtaining the desired result.

In order to increase the frictional forces between the donning head and the internal wall of the neck, the rows of balls may be offset relative to one another so that one ball of a row is surrounded by two balls of the row immediately above and/or below.

In order to allow the support elements to exert sufficient pressure against the internal wall of the neck, the elastic return means may advantageously comprise at least one elastic annular cushion arranged about the core and against which the balls bear radially elastically. In practice, the elastic annular cushion may comprise at least two juxtaposed elastic toric rings, defining at their external junction a curved annular dihedron in which the balls of a row bear. In an optimal manner, the elastic annular cushion may comprise three juxtaposed elastic toric rings, defining at their external junctions two parallel curved annular dihedrons in which respectively the balls of the two rows bear.

In order to facilitate the replacement of the elastic return means or the balls during maintenance operations, the channel may be defined, in a simple manner, by an annular groove hollowed into the front wall of the base and by a closure plate assembled on said front face of the base.

Advantageously, the present invention may be applied more particularly to installations for transporting containers provided with necks, comprising a multiplicity of transport devices arranged one after the other in an articulated manner in a transport chain and each equipped with a device for the individual support of a container by its neck as characterized above.

BRIEF DESCRIPTION OF THE DRAWINGS

The present invention is now disclosed using examples which are solely illustrative and do not in any way limit the scope of the present invention and by means of the following illustrations, in which.

DESCRIPTION OF THE PREFERRED EMBODIMENT OF THE INVENTION

For reasons of clarity in the remainder of the description, the terms "top", "bottom", "below" and "above" are solely used with reference to the arrangement of elements as shown in the figures, without these terms designating the exact arrangement of the elements in the processing installations where the invention is applied. This is more particularly the case when the gripping devices are intended to grip preforms with their neck oriented vertically towards the top, since said preforms then have to be heated with their neck oriented towards the bottom before a further turning of said preforms before the blow moulding operation and possibly the stretch blow moulding operation in a blow moulding unit.

Figure 1:
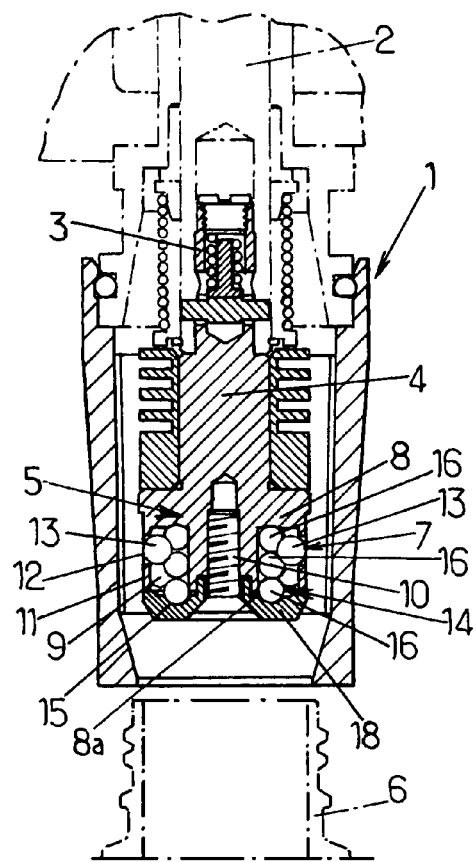
FIG. 1 is a partial sectional view of the support device according to the invention before insertion of the gripping head into the neck of a container.

FIG. 1 is a partial sectional view of a support device according to the invention which is a component of a transport device for a container.

The transport element, designated in its entirety by the reference numeral 1, comprises a rotating mandrel 2 (driven by means not shown in the figures but of the type known per se) provided with a central bore 3 in which a support member 4 is mounted, advantageously in the form of a rod, forming part of a device 5 for supporting and gripping a neck 6 of a body or a hollow container, advantageously a preform.

The support member 4 such as the rod 4 is removably mounted on the mandrel 2. Such a mounting, of the bayonet type, is known per se and exploited by the applicant. The upper part of the rod forms a bayonet cap intended to be received in a corresponding socket formed on the lower end of the bore 3.

The support member 4 is capable of being engaged inside the neck 6 of the container, for example in the neck of a preform before blow moulding the heated preform or even in the neck of the container formed after this blow moulding operation.

The support member 4 has support elements 7 which are elastically retractable in a radial direction and capable of bearing against the internal wall of the neck 6.

More specifically, the support member 4 comprises a substantially axisymmetric cylindrical base 8 comprising a peripheral channel 9 defined between a central core 10 and an external wall 11 forming a skirt surrounding the core 10 at a radial distance and perforated by at least one row of apertures 12 with a circular contour.

A plurality of balls 13 is provided forming the support elements 7 of the support member 4, of equal number to that of the apertures 12 and arranged in at least one row in the peripheral channel 9 whilst being located opposite the respective apertures 12. Advantageously, the balls 13 have a diameter substantially greater than the diameter of the apertures 12, thus enabling them to be held in the peripheral channel 9.

Elastic return means 14 are interposed between the central core 10 and the balls 13 such that said balls are pushed back elastically into the respective apertures 12 and project partially outside thereof.

In order to reinforce the frictional forces between the support member 4 and the internal wall of the neck 6, the apertures 12 and the balls 13 are advantageously distributed in at least two parallel rows.

The elastic return means 14 comprise at least one elastic annular cushion 15 arranged around the core 10 against which the balls 13 bear radially elastically.

More specifically, the elastic annular cushion 15 advantageously comprises at least two juxtaposed elastic toric rings 16, defining at their external junction a curved annular dihedron in which the balls 13 of the same row bear.

Figure 2:
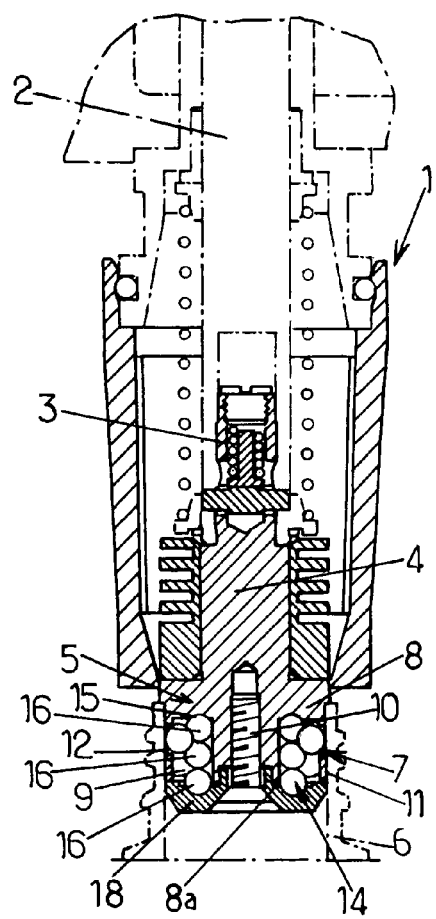
FIG. 2 is a partial sectional view of the support device after insertion of the gripping head into the neck of a container.
Figure 3:
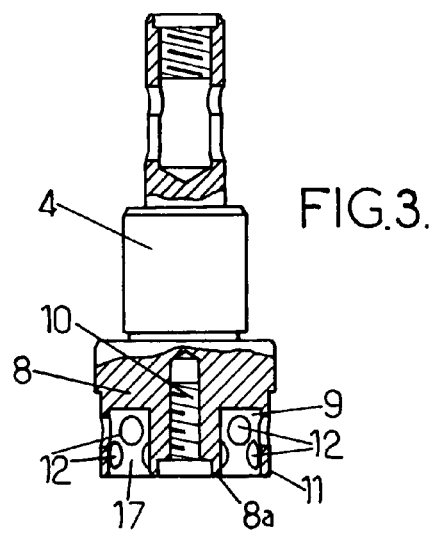
FIG. 3 is a front view of the support member divided axially.

In a preferred embodiment of the invention and as illustrated in FIGS. 1 to 3, the annular elastic cushion 15 comprises three juxtaposed elastic toric rings 16, defining at their external junctions two parallel curved annular dihedrons in which respectively the balls 13 of two rows bear.

Naturally, it is within the capability of the person skilled in the art to adapt the number of elastic toric rings 16 to the number of rows of balls 13 and apertures 12.

It is also perfectly within the capability of the person skilled in the art to adapt the number of rows of balls to the internal surface area of the neck of the container and the weight of said container.

Advantageously, in order to improve the frictional forces between the internal surface of the neck 6 and balls 13, the rows of balls 13 are offset relative to one another so that one ball 13 of a lower row is surrounded by two balls 13 of the row immediately above and/or below.

The peripheral channel 9 in which the elastic return means 14 are arranged, in addition to the balls 13, is more precisely defined by an annular groove 17 and by a closure plate 18 assembled on the front face 8*a* of the base 8, the closure plate 18 not being shown in FIG. 3 for reasons of clarity.

The term "front face 8*a*" is understood to be the face of the base 8 opposite the neck 6 of the container during the insertion of the support member 4 into the neck 6 of the container.

The closure plate 18 is fixed to the base 8 by any fixing means of the type known per se, for example using a screw capable of being threaded into the central core 10 of the base 8.

The fixing means are advantageously of the removable type, thus allowing the elastic return means 14 to be easily replaced in addition to the balls 13 once they have reached a certain degree of wear at the end of a certain time interval.

The support device 5 according to the invention is applied more particularly to installations requiring the transport of containers provided with necks and comprising a multiplicity of transport devices arranged one after the other in an articulated manner in a transport chain and each equipped with a device for the individual support of a container by its neck 6.

More precisely, the support devices 5 according to the invention are applied to the transport of preforms in a heating zone before their positioning in a mould for the blow moulding operation allowing the formation of a hollow body.

Thus, if a tunnel oven allowing the heating of the container in an installation for manufacturing and processing containers made of thermoplastic material such as PET is equipped with the transport device, each transport element of the transport device is driven in rotation about its axis so that the container is heated over its periphery using the heating means arranged in the oven on both sides of the trajectory of the transport devices.

The invention claimed is:

1. Individual support device for a container provided with a neck, capable of supporting said container by its neck, comprising a support member which is capable of being engaged inside the neck of the container and which comprises support elements which are elastically retractable in the radial direction and capable of bearing with friction against the internal wall of said neck, characterized in that the support member comprises:

a substantially axisymmetric cylindrical base comprising a peripheral channel defined between a central core and an external wall forming a skirt surrounding said core at a radial distance and perforated by at least one row of apertures of circular contour, a plurality of balls forming the aforementioned support elements, of equal number to that of the apertures and arranged in at least one row in said channel, being located opposite the respective apertures, the balls having a diameter substantially greater than the diameter of the apertures, and elastic return means interposed between said core and the balls such that said balls are pushed back elastically into the respective apertures and project partially outside thereof.

2. Support device according to claim 1, characterized in that the apertures of the external wall are distributed in a plurality of parallel rows and in that the balls are arranged in a plurality of respective rows.

3. Support device according to claim 2, characterized in that the apertures of the external wall are distributed in two parallel rows and in that the balls are arranged in two respective rows.

4. Support device according to claim 1, characterized in that the apertures of the external wall are distributed in a plurality of parallel rows and in that the rows of balls are offset relative to one another so that one ball of a row is surrounded by two balls of the row immediately above and/or below.

5. Support device according to claim 1, characterized in that the elastic return means comprise at least one elastic annular cushion arranged about the core and against which the balls bear radially elastically.

6. Support device according to claim 5, characterized in that the elastic annular cushion comprises at least two juxtaposed elastic toric rings, defining at their external junction a curved annular dihedron in which the balls of a row bear.

7. Support device according to claim 6, characterized in that the elastic annular cushion comprises three juxtaposed elastic toric rings, defining at their external junctions two parallel curved annular dihedrons in which respectively the balls of the two rows bear.

8. Support device according to claim 1, characterized in that the channel is defined by an annular groove hollowed into the front face of the base and by a closure plate assembled on said front face of the base.

9. Installation for transporting containers provided with necks, comprising a multiplicity of transport devices arranged one after the other in an articulated manner in a transport chain and each equipped with a device for the individual support of a container by its neck, characterized in that the support devices for containers are formed according to claim 1.

* * * * *